(12) United States Patent
Vieira et al.

(10) Patent No.: US 8,983,863 B2
(45) Date of Patent: Mar. 17, 2015

(54) BIDDING ENGINE FOR INTENTION-BASED E-COMMERCE AMONG BUYERS AND COMPETING SELLERS

(71) Applicant: Azul Mobile, Inc., Austin, TX (US)

(72) Inventors: Marcelo P. Vieira, Portland, OR (US); Sriram Vishwanath, Austin, TX (US)

(73) Assignee: Azul Mobile, Inc., Austin, TX (US)

( * ) Notice: Subject to any disclaimer, the term of this patent is extended or adjusted under 35 U.S.C. 154(b) by 0 days.

(21) Appl. No.: 14/311,257

(22) Filed: Jun. 21, 2014

(65) Prior Publication Data

US 2015/0019365 A1    Jan. 15, 2015

Related U.S. Application Data

(60) Provisional application No. 61/846,594, filed on Jul. 15, 2013.

(51) Int. Cl.
*G06Q 30/00* (2012.01)
*G06Q 30/08* (2012.01)

(52) U.S. Cl.
CPC ..................................... *G06Q 30/08* (2013.01)
USPC ...................................................... 705/26.3

(58) Field of Classification Search
CPC ............................... G06Q 30/08; G06Q 40/04
USPC ................ 705/26.1, 26.2, 26.25, 26.3, 26.35, 705/26.4, 26.41–26.44, 26.5, 26.7, 26.8, 705/26.81, 26.82, 26.9, 27.1, 27.2
See application file for complete search history.

(56) References Cited

U.S. PATENT DOCUMENTS

| | | | |
|---|---|---|---|
| 6,415,270 B1 * | 7/2002 | Rackson et al. ............ 705/36 R |
| 7,953,655 B1 | 5/2011 | Brewer | |
| 2002/0165817 A1 * | 11/2002 | Rackson et al. ................ 705/37 |
| 2003/0163410 A1 * | 8/2003 | Byde et al. ...................... 705/37 |
| 2003/0233315 A1 * | 12/2003 | Byde et al. ...................... 705/37 |
| 2006/0167785 A1 | 7/2006 | Mullany et al. | |
| 2008/0052219 A1 * | 2/2008 | Sandholm et al. ............. 705/37 |
| 2010/0042421 A1 | 2/2010 | Bai et al. | |
| 2011/0071900 A1 | 3/2011 | Kamath et al. | |

(Continued)

FOREIGN PATENT DOCUMENTS

JP         2009245044 A      10/2009

OTHER PUBLICATIONS

Arie Segev et al. "Optimal Design of Internet-Based Auctions", Information Technology and Management 2, 121-163, © 2001 Kluwer Academic Publishers.*

(Continued)

*Primary Examiner* — Naeem Haq
(74) *Attorney, Agent, or Firm* — David H. Judson

(57) ABSTRACT

A platform through which companies that offer products bid to obtain an opportunity to provide a product to an end user expressing an intent in purchasing it. The user specifies a first data set defining a product he or she desires to buy, a designated time at or by which it is to be provided, and a value that the user is willing to pay. The platform receives a second data set from each of one or more vendors. Each such data set includes a range of prices that the respective vendor is willing to accept for its sale of the product, and a bid strategy. A bid process is then executed to generate a result that identifies at least one vendor, and a price within the range of prices originally offered by that vendor. The result is provided to the user, and a transaction may then be consummated.

20 Claims, 14 Drawing Sheets

(56) References Cited

U.S. PATENT DOCUMENTS

2012/0303465 A1 11/2012 Smith et al.
2013/0013439 A1* 1/2013 Smullen et al. .............. 705/26.3

OTHER PUBLICATIONS

No Author, "Markov Chains", Addison-Wesley product. Copyright © 2003 Pearson Education, Inc.*

Chris Uchwat, "Case Studies of Regression and Markov Chain Models", 2012 Conference of the Transportation Association of Canada Fredericton, New Brunswick.*

Gattami, A, "Distributed Stochastic Control: A Team Theoretic Approach," 2006.

Dumas, M. et al, "A Probabilistic Approach to Automated Bidding in Alternative Auctions," WWW 2002, May 7-11, 2002.

PCT/US2014/046587, International Search Report and Written Opinion, Nov. 20, 2014.

* cited by examiner

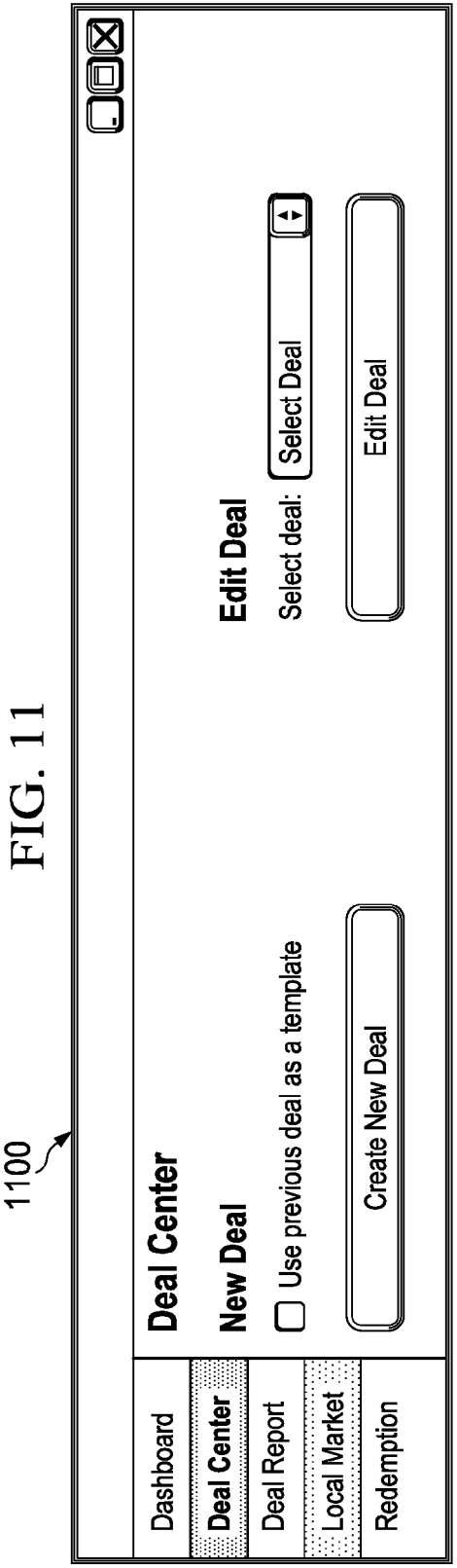

Dashboard
Deal Center
Deal Report
Local Market
Redemption

↩ Create a deal

Name this deal [ex: Weekday Lunch] — 1202

Price    Regular: [$ ex: 19.95]    Min: [$ ex: 9.97] — 1206
         1204

Number of Deals  Total deals [▾] — 1208    Daily deals [▾] — 1210

Days available  ☐ Everyday  ☐ Weekdays  ☐ Weekends  ☐ Saturday  ☐ Sunday ⎫
                ☐ Monday    ☐ Tuesday   ☐ Wednesday ☐ Thursday ☐ Friday  ⎭ 1212

Redemption period  From [08.00] — 1214   To [17.00] — 1216

Location  [-- Choose location --] [▾] — 1218

Max deals per customer  [▾] — 1220    [Select bid curve] — 1225

BIDDING ENGINE FOR INTENTION-BASED E-COMMERCE AMONG BUYERS AND COMPETING SELLERS

BACKGROUND

1. Technical Field

This application relates generally to electronic commerce among, e.g., mobile device end users, and companies that desire to sell products and services to those end users.

2. Brief Description of the Related Art

Mobile devices, such as a smartphone or tablet (e.g., Apple iPhone® and iPad® tablet, Android OS-based devices, wearable computing devices, etc.), have become ubiquitous in today's society. Faster processors, more memory, higher quality gesture-based multi-touch screens, availability of mobile broadband data, and integration of multi-media and GPS chips along with open interface mobile operating systems have opened the door for creation of a large variety of mobile applications. One such mobile application is a mobile device-based web site for a retailer. The mobile device-based web site provides information about products and services available from the retailer, together with conventional on-line shopping tools (e.g., shopping carts, product recommendation engines, etc.) to enable the mobile device end user to "shop" on the retailer's site, to identify and purchase such items, to arrange for their delivery, and the like.

Online marketplaces are also well-known. One type of marketplace provides a single web site that hosts pages from multiple providers via a common storefront. Other types of marketplaces, such as ebay.com, provide "forward" auctions wherein users bid to purchase available products. In a typical forward auction, buyers compete to obtain a good or service by offering increasingly higher prices. Other well-known sites provide reverse auctions, wherein sellers compete to obtain business from the buyer. At a reverse auction site, the site provides tools to enable users to name their own prices and to obtain products and services, such as airline tickets, hotel rooms, car rentals and vacation packages, that are available from the site. End users accessing the site select a general location, service level and price; the site maintains an inventory of available products; if a match is obtained, the hotel, rental car company and/or airline, as well as the exact location of the hotel and the exact flight itinerary, is disclosed, typically only after the purchase had gone through. In a reverse auction, prices typically decrease as the sellers undercut each other.

Other approaches to online retailing include such sites as Groupon.com or LivingSocial.com, by which local retailers define product/service deals that are then made available to end user subscribers in the form of a deal-of-the-day website that features discounted gift certificates usable at the local companies. There are many other such variations.

While the known approaches to online retailing are ubiquitous and provide many advantages to retailers and end users, there remains a need for a new paradigm that can match a customer's intention to buy with an appropriate retail offer, that, with respect to the offering sellers, enables the sale of goods and services at a higher average price (than, for example, may be available at deal-of-the-day sites), that prevents sellers from undercutting each other, and that inspires customer loyalty.

BRIEF SUMMARY

This disclosure describes an on-line electronic commerce platform (or "marketplace") through which companies that offer products and services for sale in effect bid (amongst themselves) to obtain an opportunity to provide at least one such product or service to a mobile device user who has expressed an intent in purchasing the product or service. In this approach, a mobile device user accesses the platform through a browser or mobile app executing on the user's mobile device. Using an input interface, the user specifies a first data set that defines a product or service that the mobile device end user desires to obtain, a designated time at or by which the end user desires to commit to a deal (to obtain the product or service), and a value that the end user is willing to pay for the product or service. The first data set thus is indicative of the end user's intention to obtain the desired product or service (assuming he or she can obtain that product or service at a desired price and within the time limit he or she specifies). Sometime earlier, the platform has received a second data set from each of one or more vendors (sometimes referred to as selling or providing entities or providers). A second data set is uniquely associated with a respective providing entity and includes a range of prices that the respective providing entity is willing to accept for its sale (providing) of the product or service. The second data set received from a provider also preferably includes a bid strategy defining how the respective provider desires to bid (against other such providers) to obtain a right to sell the product or service to the mobile device end user who desires to purchase it. Typically, there are as many second data sets as there are potential providers of the product or service at issue.

Once the first data set is received from a mobile device user (and assuming the second data sets have been received from the potential providers), the platform executes a bid process. The bid process is executed iteratively, and the bidding (amongst the potential providers) continues during the time period between receipt of the first data set, and the designated time at or by which the end user desires to commit to the online transaction. As the bid process executes, the platform continuously updates the mobile device user's display, thereby providing the mobile device user a list of one or more active bids (or "results") generated by the bidding. Each active bid in a set of active bids displayed to the end user identifies at least one of the providers, together with a price within the range of prices originally offered by that provider (and as specified in that provider's second data set). Preferably, the price as specified in a particular active bid displayed to the mobile device end user depends on one of more factors. These factors include, without limitation, an amount of time remaining before the end user's designated time (as specified in the first data set), a number of other mobile device users who are also indicated their intent to buy the product or service (i.e., demand), an inventory of the product or service (i.e., supply), a distance between the mobile device and a respective provider, and an amount of loyalty points the mobile device end user has accumulated with respect to a provider.

As the commit time designated by the mobile device user approaches, typically the values of the active bids update (as the bidding algorithm continues to execute iteratively against the second data sets) continuously as the selling providers in effect continue bidding (through their originally-defined bids). The process completes if the commit time designated by the mobile device user is reached; if, however, before that designated time the mobile device user decides to accept one of the active bids identified in the result list, a transaction between the mobile device end user and the selected provider is then consummated, preferably through the platform.

Preferably, the bid process applies, iteratively, a probabilistic bidding algorithm against the second data sets to generate and display the list of one or more active bids and the price updates. In a preferred embodiment, the probabilistic bidding algorithm is applied against subsets of the second data sets during a series of discrete non-uniform states that follow a continuous time-block Markov chain, and wherein an output of the probabilistic bidding algorithm typically is a function of a current and recent past state (but not necessarily a distant past state). A first subset may differ from a second subset across pairs of the discrete states. A probabilistic bidding algorithm implemented in this manner is advantageous as is avoids undesired pricing equilibria wherein respective second entities would otherwise simply be driven to minimum prices within their respective price ranges as a result of otherwise unconstrained bidding.

The platform is implemented in a scalable, reliable and highly-available manner, e.g., in a cloud-compute environment, and thus provides for an unlimited number of concurrent bidding scenarios such as the one described above. To this end, preferably the platform includes a web-accessible front-end through which the mobile device end users (and there may be an unlimited number of them) submit the intent-to-purchase information, and through which the multiple provider entities interact with the platform services (e.g., to register for the service, to submit their bids (the second data sets), and the like. An application or middleware layer of the platform executes the software applications that carry out the probabilistic bidding, to provide the active bid result(s), to facilitate that transaction(s), to interact with third party systems as needed, and the like. The platform also includes administrative, management, and other services as needed to facilitate the providing of a web-accessible reverse bidding and transaction service.

The foregoing has outlined some of the more pertinent features of the subject matter. These features should be construed to be merely illustrative. Many other beneficial results can be attained by applying the disclosed subject matter in a different manner or by modifying the subject matter as will be described.

BRIEF DESCRIPTION OF THE DRAWINGS

For a more complete understanding of the subject matter and the advantages thereof, reference is now made to the following descriptions taken in conjunction with the accompanying drawings, in which:

FIG. 11 illustrates a representative display screen by which a merchant initiates the process of configuring a "deal" (a particular product or service);

FIG. 12 illustrates a first portion of the Create a Deal configurator;

DETAILED DESCRIPTION

The disclosed method may be practiced in association with a computing infrastructure comprising one or more data processing machines.

Enabling Technologies

Figure 1:
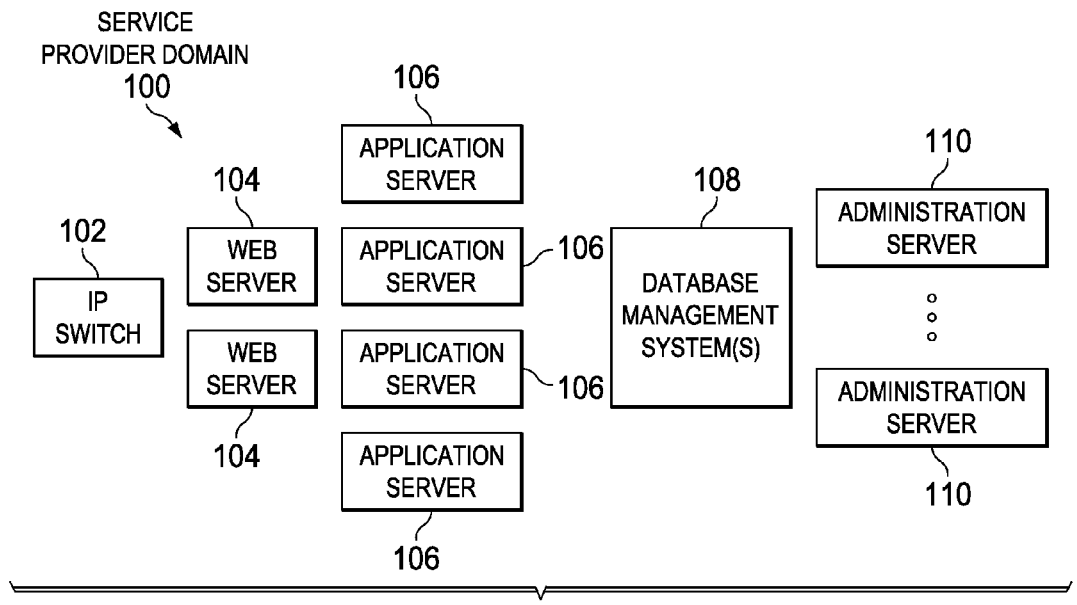
FIG. 1 is a service provider platform from which an online marketplace according to this disclosure is provided to mobile device users and merchants.

A representative infrastructure is a service that provides an interactive online marketplace. This type of service (in whole or in part) may be implemented on or in association with a service provider infrastructure 100 such as seen in FIG. 1. A representative infrastructure of this type comprises an IP switch 102, a set of one or more web server machines 104, a set of one more application server machines 106, a database management system 108, and a set of one or more administration server machines 110. Without meant to be limiting, a representative technology platform that implements the service comprises machines, systems, sub-systems, applications, databases, interfaces and other computing and telecommunications resources. A representative web server machine comprises commodity hardware (e.g., Intel-based), an operating system such as Linux, and a web server such as Apache 2.5+ (or equivalent). A representative application server machine comprises commodity hardware, Linux, and an application server such as WebLogic 9.2+ (or equivalent). The database management system may be implemented as an Oracle (or equivalent) database management package running on Linux. The infrastructure may include a name service, FTP servers, administrative servers, data collection services, management and reporting servers, other backend servers, load balancing appliances, other switches, and the like. Each machine typically comprises sufficient disk and memory, as well as input and output devices. The software environment on each machine includes a Java virtual machine (JVM) if control programs are written in Java. Generally, the web servers handle incoming business entity provisioning requests, and they export a management interface. The application servers manage the basic functions of the service including, without limitation, business logic.

One or more functions of such a technology platform may be implemented in a cloud-based architecture. As is well-known, cloud computing is a model of service delivery for enabling on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. Available services models that may be leveraged in whole or in part include: Software as a Service (SaaS) (the provider's applications running on cloud infrastructure); Platform as a service (PaaS) (the customer deploys applications that may be created using provider tools onto the cloud infrastructure); Infrastructure as a Service (IaaS) (customer provisions its own processing, storage, networks and other computing resources and can deploy and run operating systems and applications).

The platform may comprise co-located hardware and software resources, or resources that are physically, logically, virtually and/or geographically distinct. Communication networks used to communicate to and from the platform services may be packet-based, non-packet based, and secure or non-secure, or some combination thereof.

More generally, the techniques described herein are provided using a set of one or more computing-related entities (systems, machines, processes, programs, libraries, functions, or the like) that together facilitate or provide the described functionality described above. In a typical implementation, a representative machine on which the software executes comprises commodity hardware, an operating system, an application runtime environment, and a set of applications or processes and associated data, that provide the functionality of a given system or subsystem. As described, the functionality may be implemented in a standalone machine, or across a distributed set of machines.

The front-end of the above-described infrastructure is also representative of a conventional third party web site.

Typically, but without limitation, a client device is a mobile device, such as a smartphone, tablet (e.g., an iPhone® or iPad®) or wearable computing device. Such a device comprises a CPU (central processing unit), computer memory, such as RAM, and a drive. The device software includes an operating system (e.g., Apple iOS, Google® Android™, or the like), and generic support applications and utilities. The device may also include a graphics processing unit (GPU). The mobile device also includes a touch-sensing device or interface configured to receive input from a user's touch and to send this information to processor. The touch-sensing device typically is a touch screen. The mobile device comprises suitable programming to facilitate gesture-based control, in a manner that is known in the art.

Figure 2:
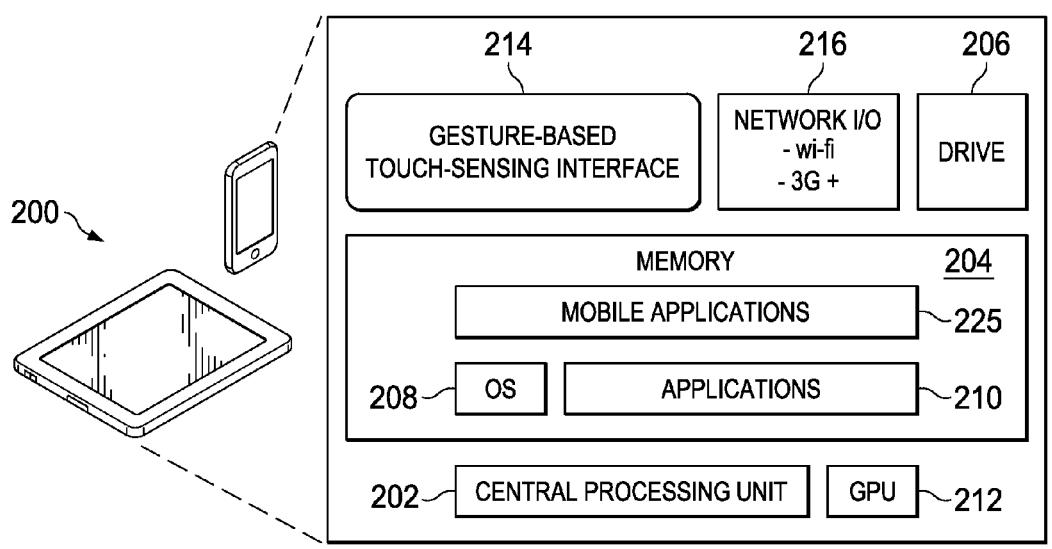
FIG. 2 is a representative mobile device by which an end user (a prospective buyer) can access the online marketplace to solicit the purchase of a product or service that is available from the marketplace.

As seen in FIG. 2, a representative end user client device 200 comprises a CPU (central processing unit) 202, such as any Intel- or AMD-based chip, computer memory 204, such as RAM, and a drive 206 (e.g., Flash-based). The device software includes an operating system (e.g., Apple iOS, Google® Android™, or the like) 208, and generic support applications and utilities 210. The device may also include a graphics processing unit (GPU) 212. In particular, the mobile device also includes an input device or interface 214 configured to receive input from a user's touch or other gesture, and to send this information to processor 212. The input device typically is a touch screen, but this is not a limitation. The input device or interface 214 recognizes sensory inputs, such as touches or other gestures, as well as the position, motion and magnitude of inputs on the user interface. The device also includes network I/O support 216 to support network transport (WiFi, 3 G+). In operation, the touch-sensing device detects and reports the touches to the processor 212, which then interpret the touches in accordance with its programming. Typically, the touch screen is positioned over or in front of a display screen, integrated with a display device, or it can be a separate component, such as a touch pad. The touch-sensing device is based on sensing technologies including, without limitation, capacitive sensing, resistive sensing, surface acoustic wave sensing, pressure sensing, optical sensing, and/or the like.

Other data input mechanisms, such as voice recognition, may be utilized in the device 200.

Generalizing, the mobile device is any wireless client device, e.g., a cellphone, pager, a personal digital assistant (PDA, e.g., with GPRS NIC), a mobile computer with a smartphone client, or the like. Other mobile devices in which the technique may be practiced include any access protocol-enabled device (e.g., a Blackberry® device, an Android™-based device, or the like) that is capable of sending and receiving data in a wireless manner using a wireless protocol. Typical wireless protocols are: WiFi, GSM/GPRS, CDMA or WiMax. These protocols implement the ISO/OSI Physical and Data Link layers (Layers 1 & 2) upon which a traditional networking stack is built, complete with IP, TCP, SSL/TLS and HTTP.

In a representative embodiment, the mobile device is a cellular telephone that operates over GPRS (General Packet Radio Service), which is a data technology for GSM networks. In addition to a conventional voice communication, a given mobile device can communicate with another such device via many different types of message transfer techniques, including SMS (short message service), enhanced SMS (EMS), multi-media message (MMS), email, WAP, paging, or other known or later-developed wireless data formats. Generalizing, a mobile device as used herein is a 3 G– (or next generation) compliant device that includes a subscriber identity module (SIM), which is a smart card that carries subscriber-specific information, mobile equipment (e.g., radio and associated signal processing devices), a man-machine interface (MMI), and one or more interfaces to external devices (e.g., computers, PDAs, and the like). The techniques disclosed herein are not limited for use with a mobile device that uses a particular access protocol. The mobile device typically also has support for wireless local area network (WLAN) technologies, such as Wi-Fi. WLAN is based on IEEE 802.11 standards.

The underlying network transport may be any communication medium including, without limitation, cellular, wireless, Wi-Fi, small cell (e.g., femto), and combinations thereof.

As noted above, the companion device is not limited to a mobile device, as it may be a conventional desktop, laptop or other Internet-accessible machine or device running a web browser, browser plug-in, or other application. It may also be a mobile computer with a smartphone client, any network-connected appliance or machine, any network-connectable device (e.g., a smart wrist device), or the like.

As also seen in FIG. 2, the mobile device includes a mobile app (or native application, or the like) 225 that implements the end user (client-side) functionality of the technique of this disclosure, which is now described.

Bidding Engine for Intention-Based Buying and Selling

Figure 3:
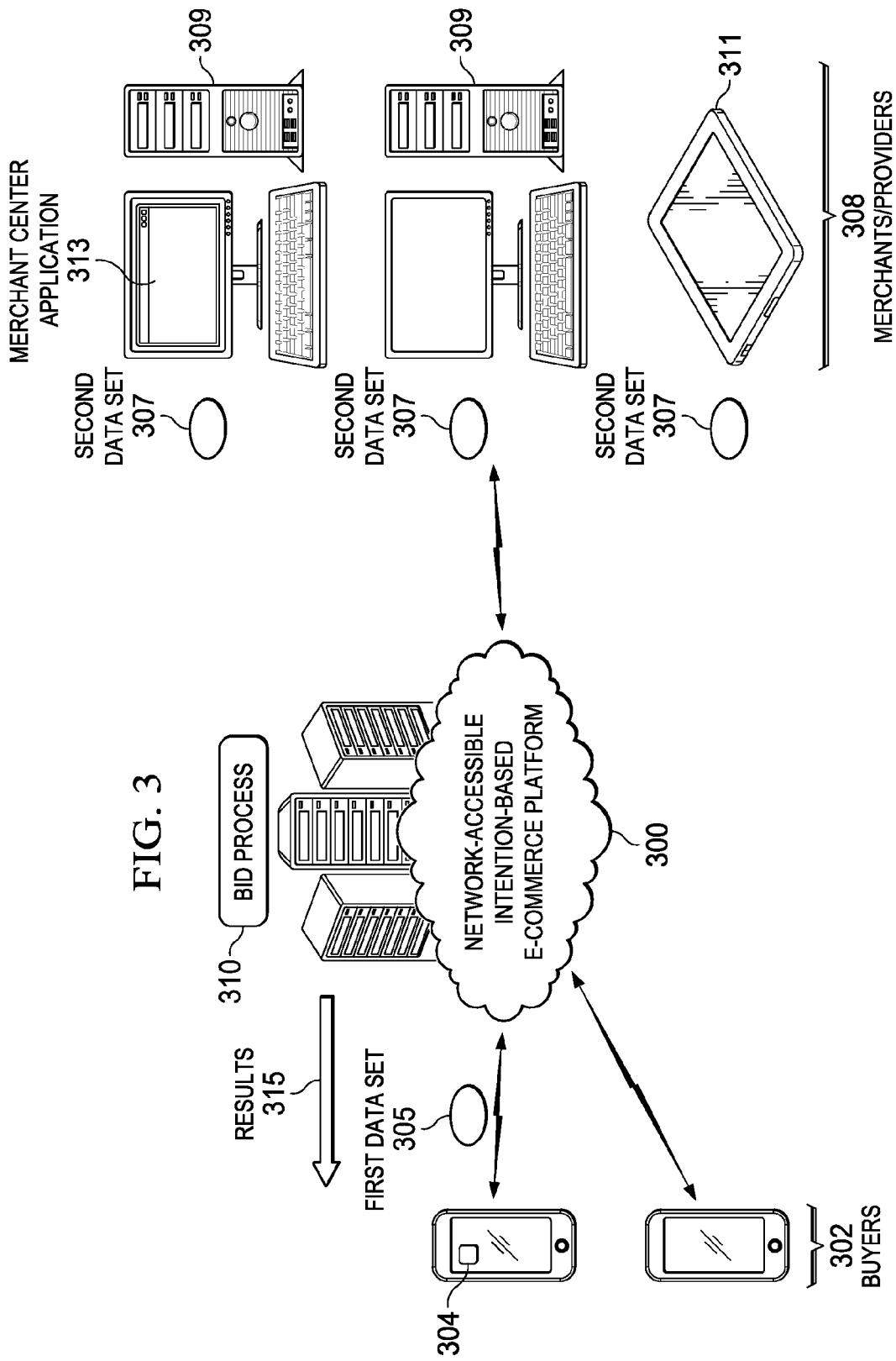
FIG. 3 illustrates a representative interaction between, on the one hand, a mobile device user, and, on the other hand, a set of merchant entities that are participating in a bidding process (that is executed on the service provider platform) in an attempt to match the buyer to a willing seller.

With the above as background, FIG. 3 illustrates the basic transaction approach of this disclosure. In this approach, as has been described above, a prospective buyer (more generally, a "first entity") defines his or her (or its) intent to buy, typically through a display interface (a set of display screens) exposed on the end user's mobile device app 225 (such as illustrated in FIG. 2).

Preferably, and according to an aspect of this disclosure, a first entity's intent to buy is expressed in a so-called 3WHM format (corresponding to the following attributes: what, when, where and how much). In this way, the end user tells the platform (such as shown in FIG. 1) when and where he or she wants to buy, and the platform uses this information to find businesses (or, more generally, a set of one or more "second entities") that are ready to compete for the funds that the end user is prepared to spend (based on the 3WHM specification. Typically, the buyer will have downloaded and installed the mobile app on his or her mobile device. The buyer expresses his or her intent by launching the mobile device app, entering information about what product or service is of interest, how much time the user wants to commit to a deal, how far the user is willing to travel, how much the user wants to spend, etc. The app may display a default list of available deals, or available deals may be located via a search interface (e.g. to enable the user to browse bids by location relative to the user's location). The user may sort available deals by favorites, by lowest-to-highest prices, or the like.

While the 3WHM format provides a detailed view of the user's buying intent, it is not required that all four data points (what, when, where and how much) are used. Thus, for example, in an alternative embodiment, the end user's intent may be expressed by fewer data points, such as 2WHM (what, where and how much).

Preferably, the second entities (the businesses) interact with the platform separately. As will be described in more detail below, a merchant registers to use the service. It defines a product/service for sale, preferably based on a predefined price range.

In the basic operation, the platform receives the 3WHM information from the end user and executes a bid process against a set of bids entered by the vendors who have registered to use the service. As an iteration of the bidding completes, a set of "active bids" or "results" is returned to requesting end user, preferably in the form of a data stream. Each active bid in the set of active bids (and there may be one or more of them) includes s a price. If the buyer wants to proceed, the transaction is then consummated, preferably at least in part through the platform. Typically, as the clock counts down toward the end user's commit time, the prices in the active bids update (due to follow-on iterations of the bidding), typically on a continuous basis, so that the mobile device end user sees active bids that are or may be changing, possibly frequently. When the commit time is reached, the bidding is ended (and, typically, no deal is consummated).

FIG. 3 illustrates the basic process in detail. Thus, in this approach, a mobile device user accesses the platform 300 through a browser or mobile app 304 executing on the user's mobile device 302. Using an input interface, the user specifies a first data set 305 that defines a product or service that the mobile device end user desires to buy, a designated time at or by which the product or service is to be provided (to the end user), and a value that the end user is willing to pay for the product or service. The first data set 305 thus is indicative of the end user's intention to buy the desired product or service (assuming he or she can obtain that product or service at a desired time and price). To facilitate a possible transaction involving the desired product or service, the platform 300 receives (or, more commonly, has previously received) a second data set 307 from each of one or more vendors (sometimes referred to as selling or providing entities or providers) 308. A provider 308 operates a computing machine, such as a desktop 309, a tablet 311, or the like, that executes a merchant center application 313 (described in more detail below) by which the provider creates the deal(s) that end users may offer to purchase. A second data set 307 is uniquely associated with a respective providing entity 308 and includes a range of prices that the respective providing entity is willing to accept for its sale (providing) of the product or service. The second data set received from a provider also includes a bid strategy defining how the respective provider desires to bid (against other such providers) to obtain a right to sell the product or service to the mobile device end user who desires to purchase it. Without limitation, the bid strategy typically is one of: a first strategy designed to maximize a number of first entities for the product or service, a second strategy designed to maximize the price the respective second entity can obtain for the product or service, and a third strategy designed to trade-off, as a linear function, a number of first entities versus a maximum price for the product or service.

Typically, there are as many second data sets 307 as there are potential providers of the product or service at issue, although this is not a requirement. Once the second data sets are received from the potential providers, the platform 300 executes a bid process 310 (also described below) to generate, on a continuous basis, sets of active bids (or "result") 315. Each active bid in a set of active bids identifies at least one of the providers 308, and a price within the range of prices originally offered by that provider (and as specified in that provider's second data set). Preferably, the price as specified in the result depends on one of more factors, such as an amount of time remaining before the end user's designated time (as specified in the first data set), a number of other mobile device users who are also indicated their intent to buy the product or service (i.e., demand), an inventory of the product or service (i.e., supply), and other factors.

The platform 300 provides the result sets 315 to the mobile device end user. As noted above, the active bid prices typically are continuously updated as the clock counts down toward the commit time identified by the end user. If one of the active bids is accepted prior to that time, a transaction between the mobile device end user and the selected provider is consummated, preferably through the platform. The transaction may be of any type, such as sending a notification to the mobile device (e.g., via a text message, an e-mail, or the link) that includes a confirmation that the particular bid is accepted.

Of course, the process shown in FIG. 3 is illustrated in the context of a single mobile device user, and a set of vendors that are offering to provide a particular deal. The platform is designed to scale to large numbers of mobile devices users, and large numbers of vendors, each of whom use the shared infrastructure platform in the manner described above. There is no limit to the number of mobile device users, vendors, product/service categories, deals, etc.

The following provides additional details regarding a mobile device user interface by which a mobile device user accesses the platform, enters bid requests, receives results, and executes transactions. As noted above, preferably the mobile device user interface typically is provided by a mobile app (or a browser-based set of pages) that interacts with the front-end of the marketplace as a conventional mobile-based web application. The display interface typically comprises a set of user-accessible display screens. The mobile app is provided to the mobile device as a native application, or the app may be downloaded and installed on the device, e.g., from an online app store such as Apple iTunes®. Although not shown in detail, the mobile app includes a settings interface by which the end user establishes an account, identifies defaults and favorites, configures payment information (e.g., credit card data), and the like. The mobile app may interface with other social networks such as Facebook, Twitter, and the like. The mobile app may also provide additional features and functions, such as loyalty points, games, and other content. The end user downloads and installs the mobile app, provisions the app, and then logs into the platform using a credential.

Figure 4:
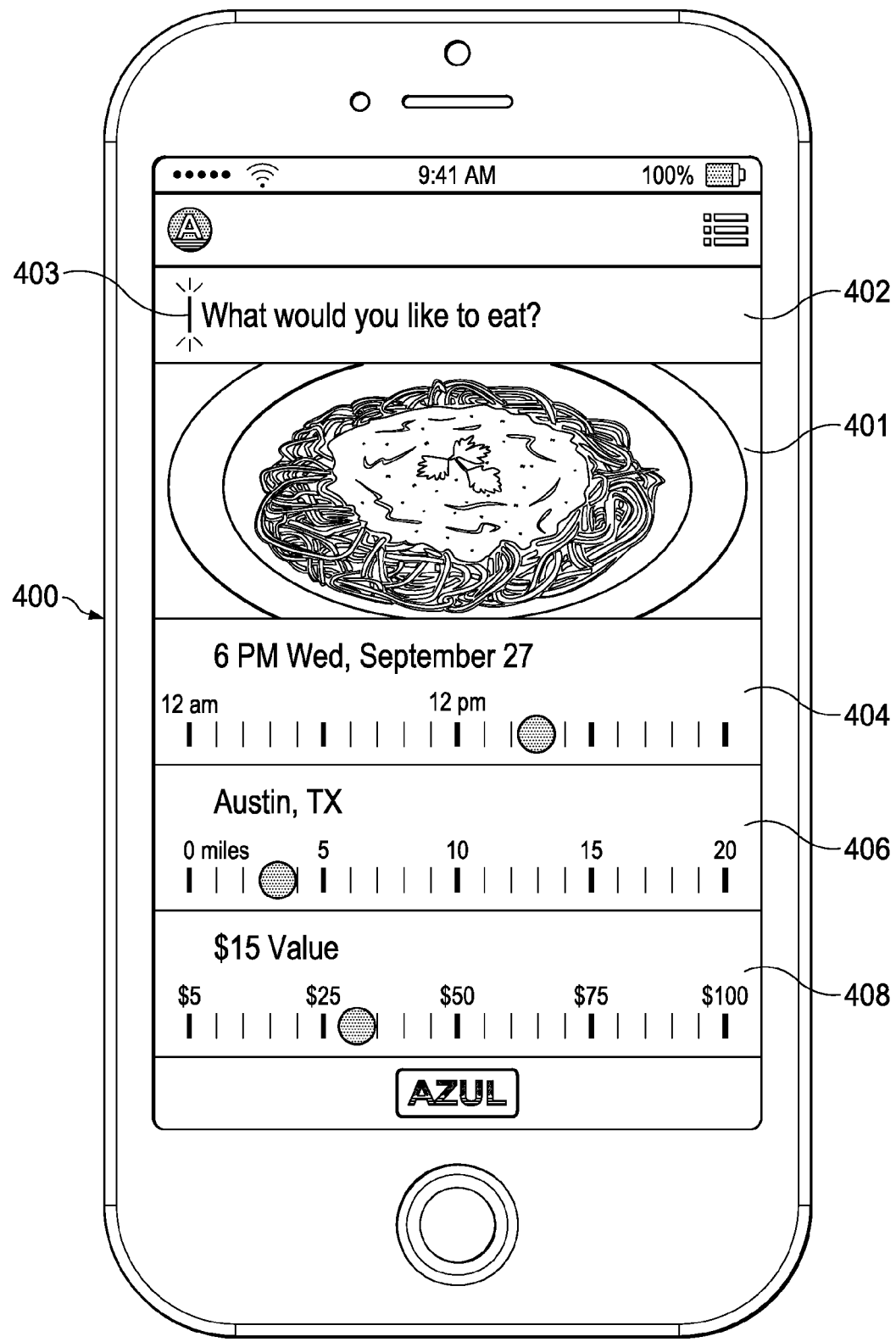
FIG. 4 illustrates an end user mobile device bid request display screen that is displayed after the end user launches the mobile app to the service provider platform.
Figure 5:
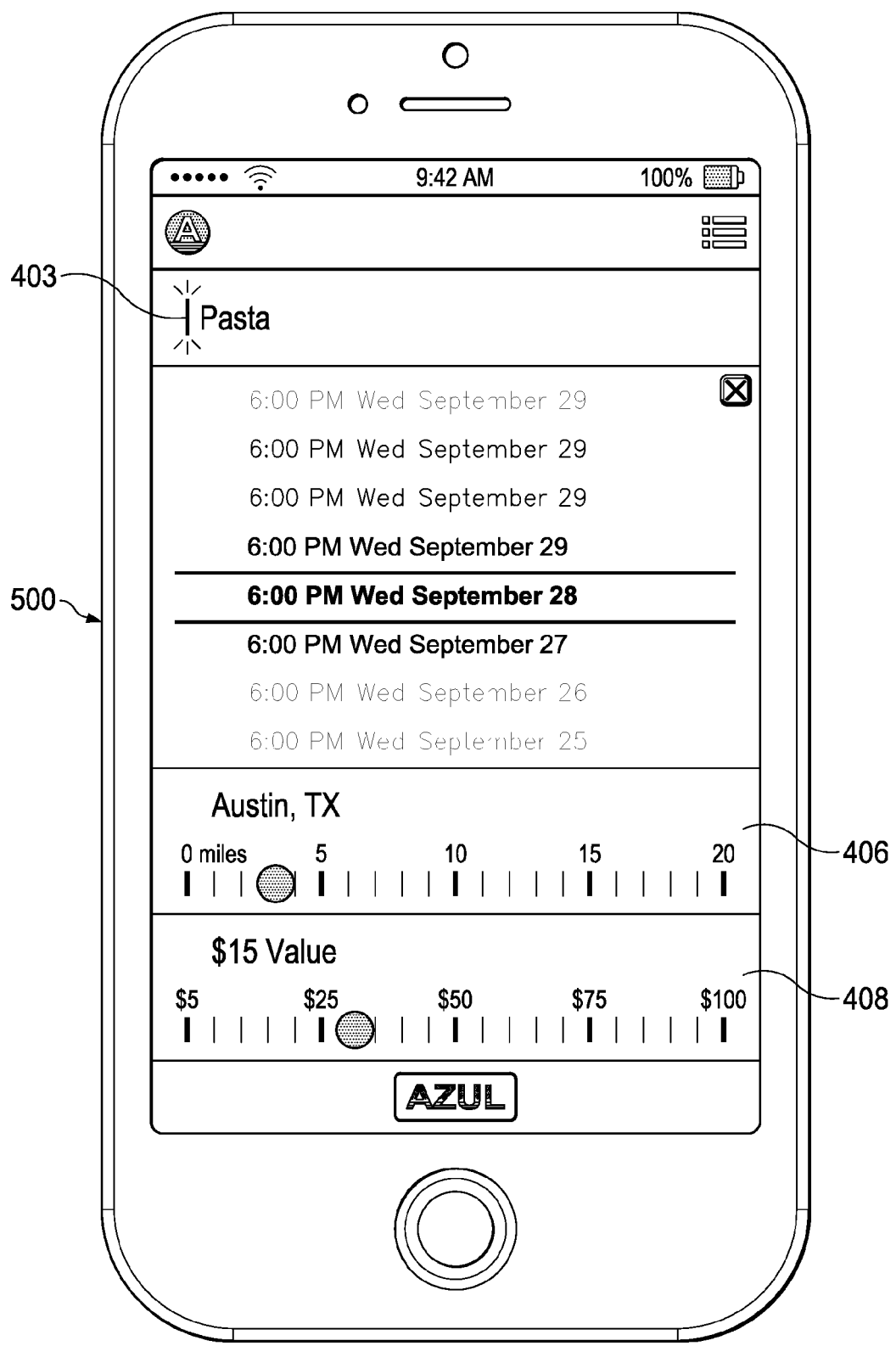
FIG. 5 illustrates the display after the user selects an option (in the display in FIG. 4) to change the time needed to commit to a deal.
Figure 6:
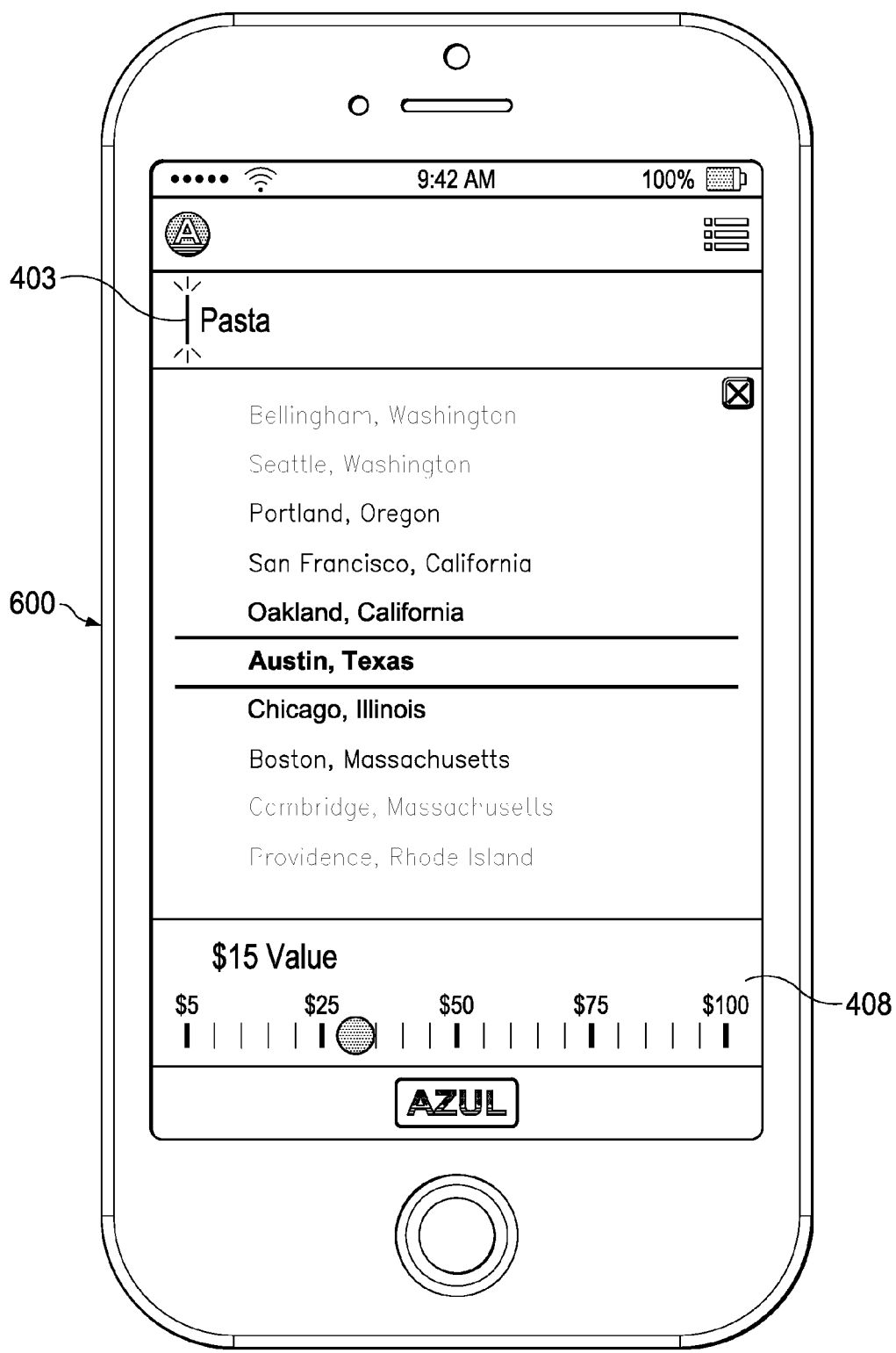
FIG. 6 illustrates the display after the user selects an option (in the display in FIG. 4) to change a location.

FIG. 4 illustrates the end user mobile device bid request display screen 400 that is displayed after the end user launches the mobile app to the service provider platform. Preferably, the display prompts 402 the user to enter information about what the user wants to buy (in this example, the product/service is an Italian restaurant). An image 401 illustrates the basic category or sub-category of the product/service. Of course, there is no limitation regarding the product/service categories or sub-categories or types that may be exposed by the services platform. A flashing cursor 403 may be used to facilitate the prompt. A timer widget 404 is set to a user-designed time needed to commit to a deal. The user can tap the timer widget 404 and navigate to the screen shown in FIG. 5 to change the date. In particular, FIG. 5 illustrates the display after the user selects an option (in the display in FIG. 4) to change the time needed to commit to a deal. As also seen in FIG. 4, the display screen preferably includes a location widget 406 by which the end user can enter information about how far he or she is willing to travel for the deal. The user can change the location by tapping on the location widget, which action opens the display shown in FIG. 6. The location display may be a different city, a different location within a city, or the like. The display 400 also preferably includes a price widget 408 that identifies how much the end user wants to spend. By tapping the price widget, the displayed pricing is altered so that the user can select smaller increments. Using the display interface, the end user inputs the 3WHM information that comprises a bid request (the "first data set").

The particular display widgets shown in FIG. 4 are merely exemplary, as other display widgets, graphics, layouts, display screen workflow, and the like, may be used.

Figure 7:
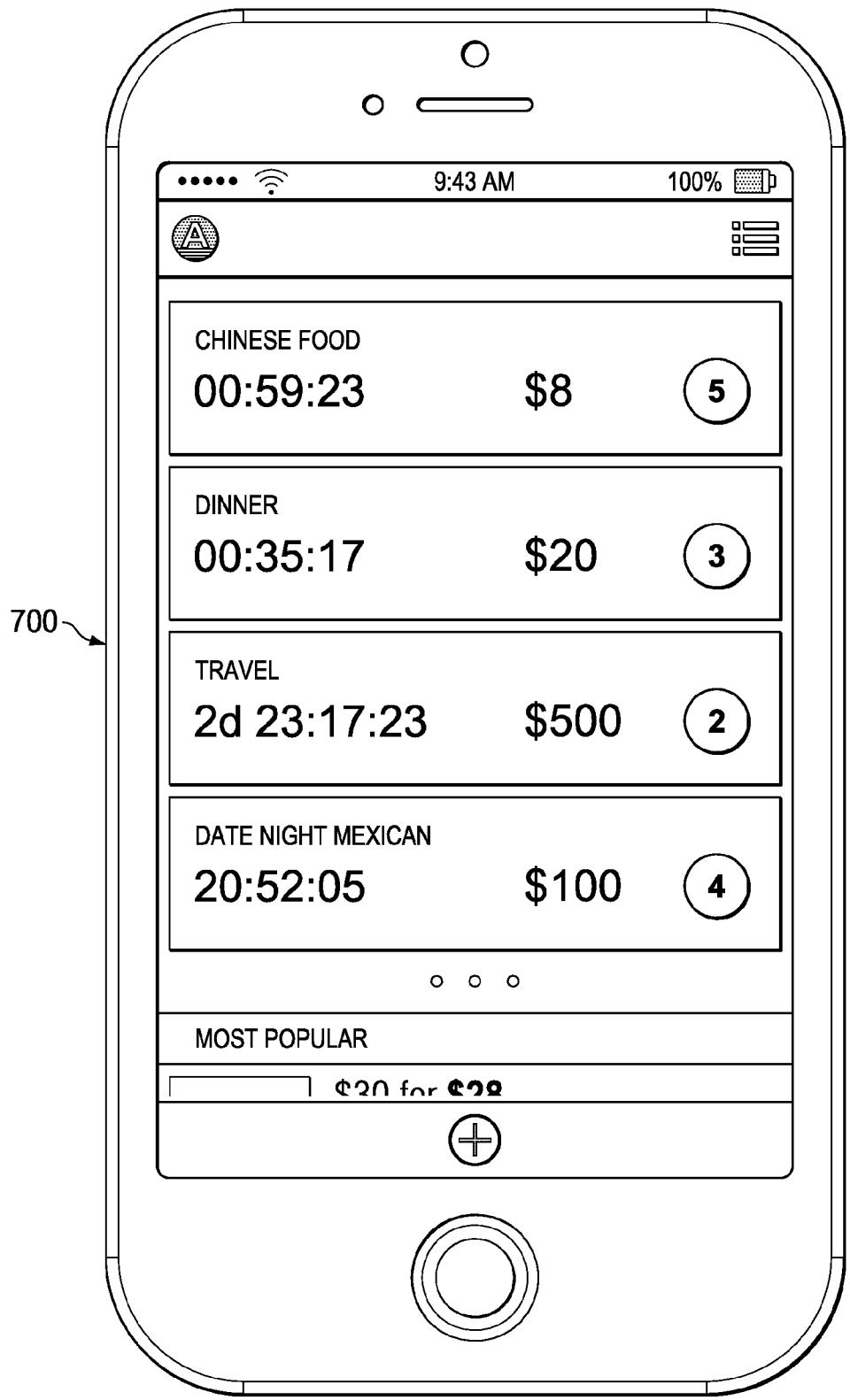
FIG. 7 illustrates a home screen for the mobile app showing bid requests that have configured by the end user and submitted to the platform.

FIG. 7 illustrates a representative display screen for the mobile app (which may be the home screen) showing multiple bid requests that have been configured by the end user and submitted to the platform using the display elements described above. In this example, the user has submitted bid requests for Chinese food, dinner, travel and Mexican food. The particular commit time for each bid is shown (running down toward the expiration). Once again, the particular layout here is merely illustrative and should not be taken by way of limitation.

Figure 8:
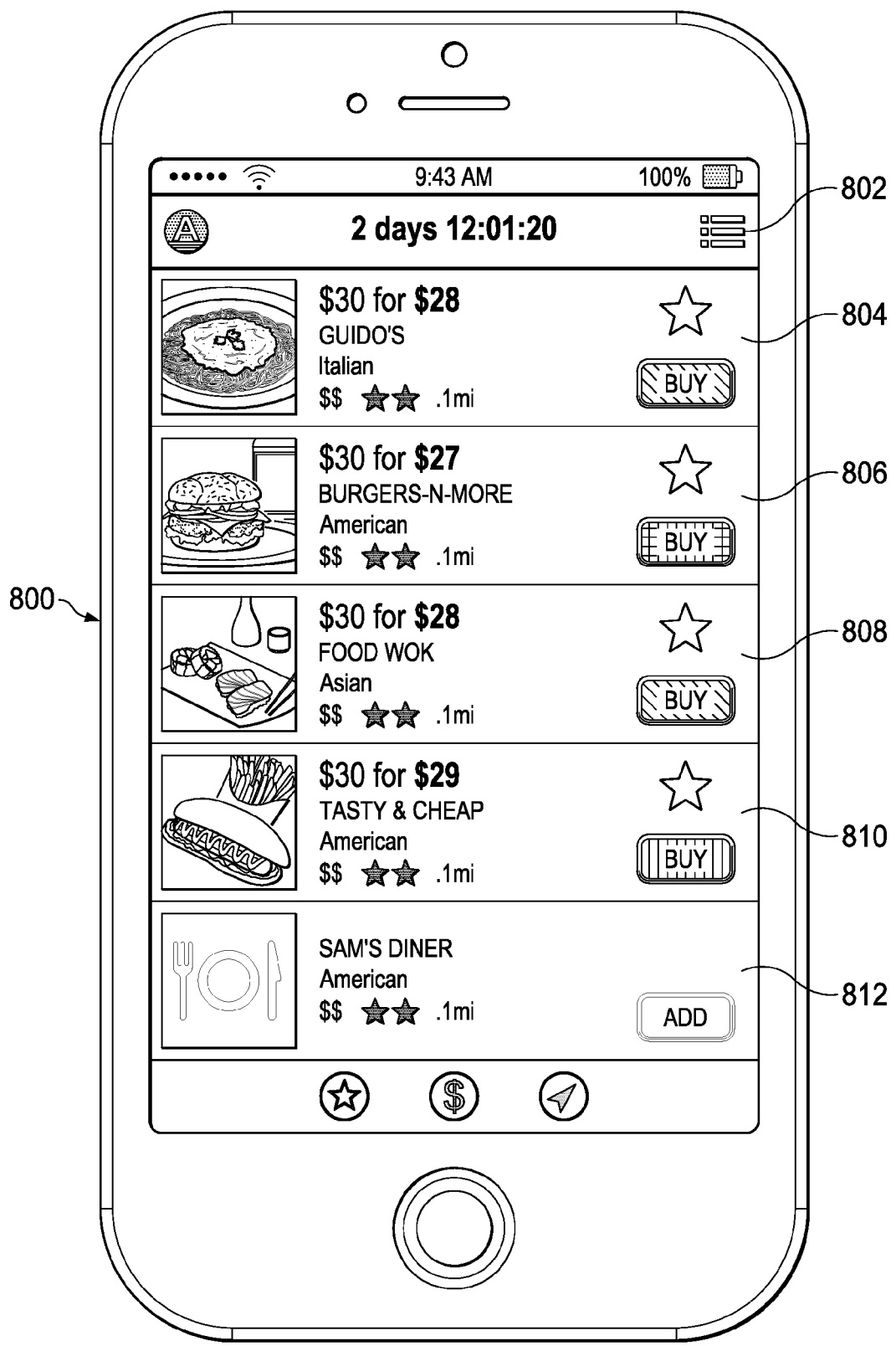
FIG. 8 illustrates an end user mobile device active bid display screen that illustrates a default list of recently-updated deals.

FIG. 8 illustrates a representative mobile application "active bids" display screen 800 that illustrates a scrollable list of recently-updated deals for a particular product/service that the user previously indicated his or her intent in obtaining. In this example display, the active bids 804, 806, 808 and 810 are provided in response to a restaurant lunch "deal" that the user is seeking two days in the future. Preferably, the default list displays the most recent updated deals with one or more visual cues, such as colored "Buy" buttons. Thus, e.g., a particular deal (such as deal 804) might flash a green Buy button if the is plenty of inventory available, whereas another deal (such as deal 806) might flash a yellow Buy button if the inventory is moving well and will soon be exhausted. A deal (such as deal 810) may flash a red Buy button if it is a "hot" deal and could go (get accepted) at any moment. The user can swipe a particular deal for more information. Thus, for example, the end user might tap the star to add the deal to his or her "Favorites" list. By swiping right, the user can delete the deal. As also seen in FIG. 8, the user (using a separate display screen, not shown) may request a favorite establishment (here shown as 812) to be "added," in which case a pop-up window may also be rendered, such as "Thanks for suggesting we add [name] to the marketplace. We will be sure to invite them to join."

Each active bid in the display list shown in FIG. 8 includes the identified vendor's current price. As the bidding algorithm continues to iterate, a new set of active bid values typically are generated, and this process continues until the end user's commit time expires. The user may buy the deal before time runs out (as illustrated by a countdown clock), or the deal gets eliminated or sold-out.

Of course, the commit time for any particular product/service purchase may vary. Thus, the same mobile device end user may seek to buy a particular product by time x, and to buy a particular service by time y. Each set of active bids returned in response to the proposal with then vary accordingly.

Figure 9:
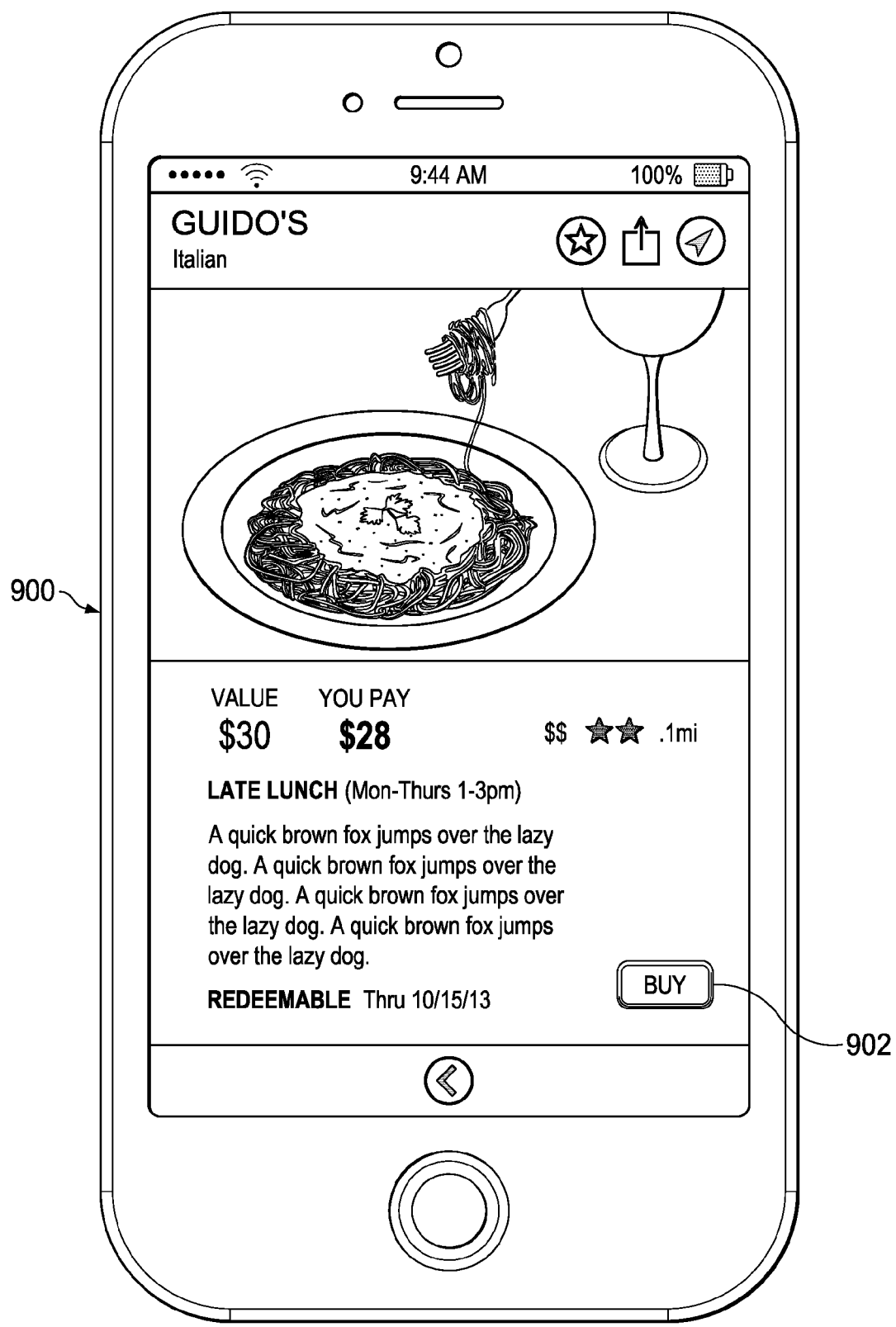
FIG. 9 illustrates an end user mobile device display screen by which the end user can obtain more detail, terms, location and other information being bid on and then initiate a request to buy the deal.
Figure 10:
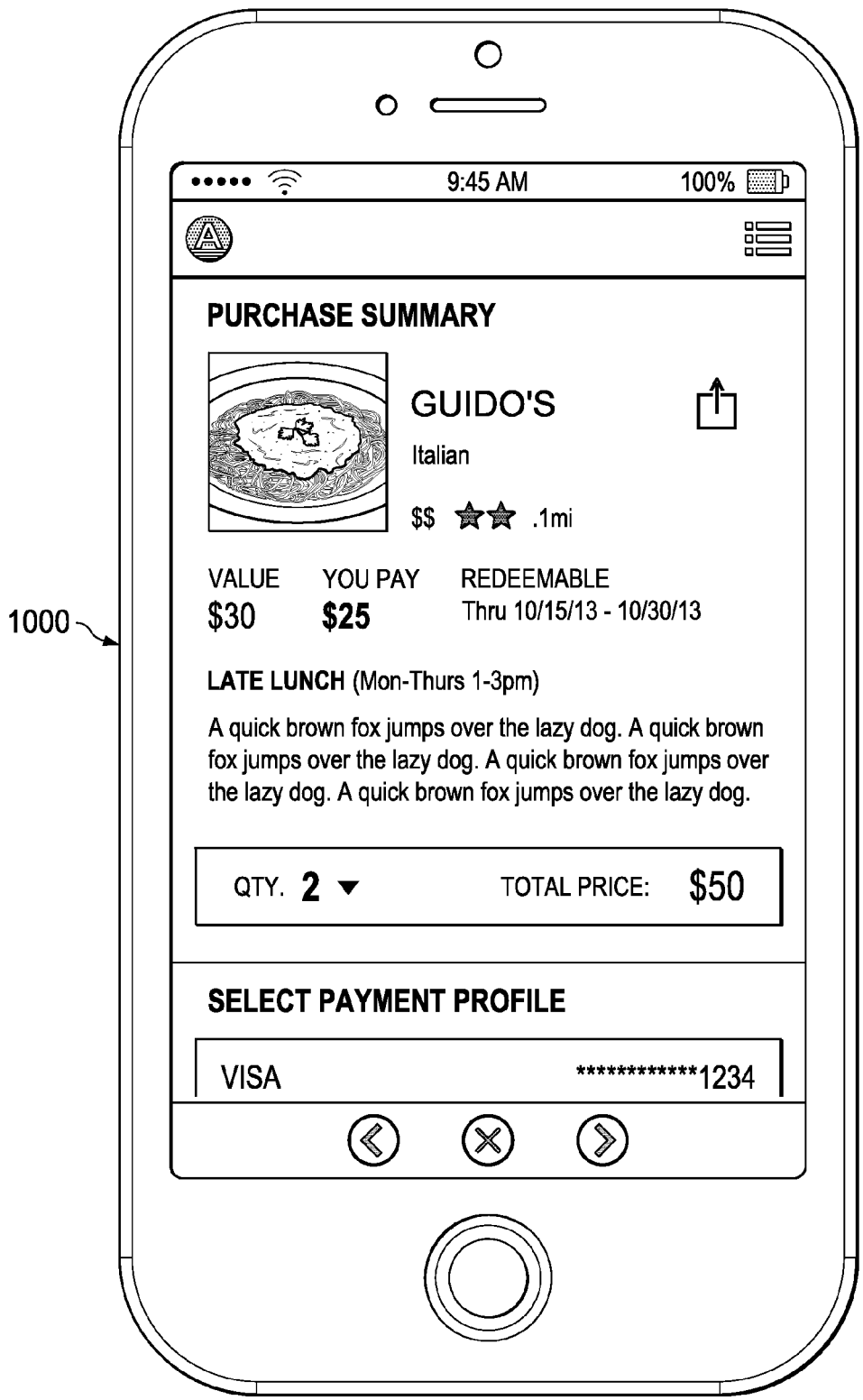
FIG. 10 illustrates an end user mobile device buy confirmation display screen by which the end user receives confirmation that the transaction has been consummated at the agreed-upon price.

By tapping on any displayed deal, the user can obtain additional information and/or undertake to buy the deal. FIG. 9 illustrates the mobile application display screen 900 after the user has tapped the display to obtain more detail, terms, location and other information being bid on, and then to initiate a request to buy the deal using Buy button 902. In this example, the "You Pay" value represents the final bid price (assuming the user selects "Buy"). This value may change on a continuous basis as a next iteration of the bid process completes. FIG. 10 illustrates the mobile application display screen 1000 after the user has elected to Buy, and the information provides a confirmation of the transaction.

Of course, the above-described and illustrated interface is not intended to be limiting, as any suitable end user device configuration interface may be used to receive the 3WHM information.

Thus, in the described approach, the user tells the platform what he or she wants, when, where (implied based on location of the device), and how much he or she is willing to pay. Over time, as the end user continues to use the mobile app, preferably the platform learns about the user's buying habits and proclivities, and may use such knowledge to facilitate new interactions with the platform. The merchants who can offer the desired product or service then bid for the opportunity to provide what the end user needs and wants, and preferably only when the user wants to buy (as identified in the commit time). The approach then implements a reverse bidding algorithm to deliver results to end users, who then can purchase the "deals."

Preferably, end users (consumers) download and use the mobile app for free.

Figure 13:
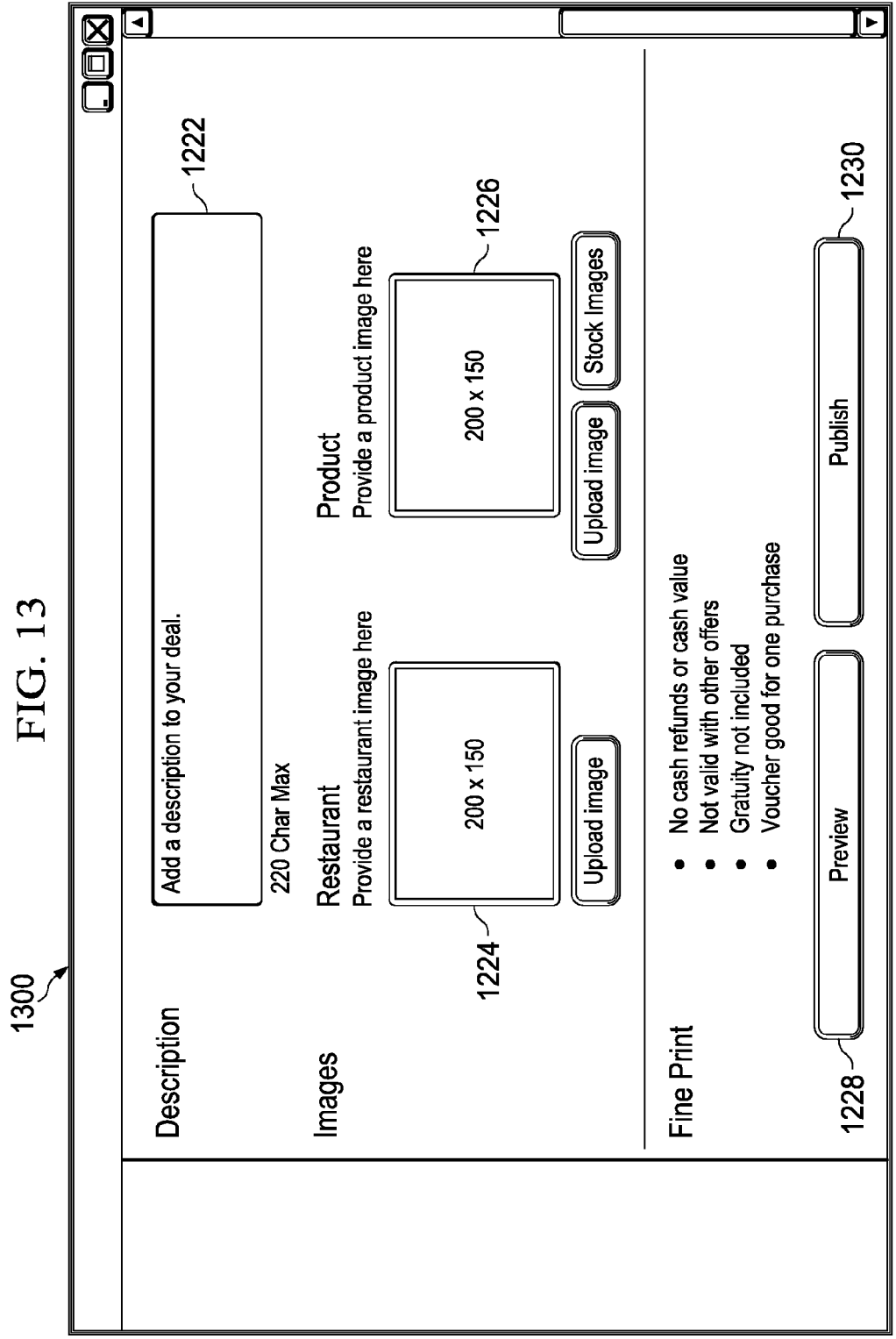
FIG. 13 illustrates a second portion of the Create a Deal configurator.
Figure 14:
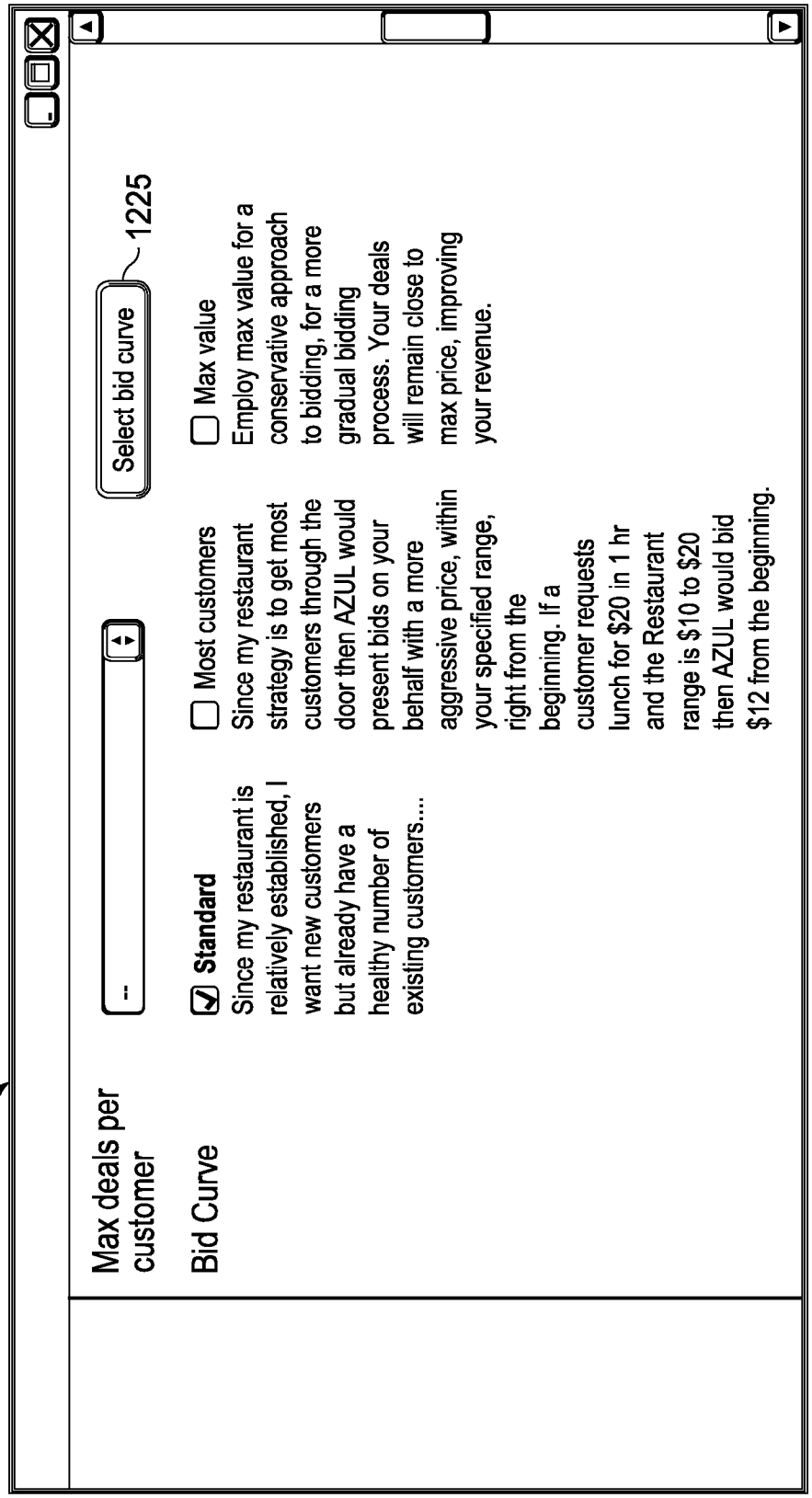
FIG. 14 illustrates a set of options for the vendor to select an appropriate bid curve that is used by the bidding algorithm for the particular deal.

Preferably, merchants sign up and can view the marketplace, preferably at no expense. The marketplace thus exposes information about how many customers may be looking for a particular product or service. The merchant can then create a new deal, or edit an existing deal, using a display screen such as shown in FIG. 11. The interface provided to the merchant typically is secured (e.g., as a set of SSL-secured web pages) from another web application, such as a secure merchant portal (or dashboard) associated with the platform. When the merchant selects the "Create New Deal" button in the interface, the display screens shown in FIGS. 12-14 are used to configure the vendor deal (the "second data set" as described above). As illustrated in FIG. 12, the vendor can name the deal in field 1202, set a regular price in field 1204, set a minimum price in field 1206, identify a total number of deals in field 1208 it is willing to accept at the particular pricing, identify a daily number of deals in field 1210 it is willing to accept at the particular pricing, specify (via checkboxes 1212) the available days the offer will be available at the particular pricing, identify any redemption period in fields 1214 and 1216, identify the location(s) in field 1218 at which the deal will apply, and identify a maximum number of deals per customer (mobile device user) in field 1220 that may be accepted. Referring to FIG. 13, which is a continuation of the display shown in FIG. 12, a deal "description" may be provided in field 1222. The vendor may upload images for the product/service offering using drop-and-drag uploader fields 1224 and 1226, preview the deal using button 1228, and publish the deal to the platform using button 1230.

As also seen in FIG. 12, preferably the display enables the vendor to select a "bid curve" using button 1225. FIG. 14 illustrates three (3) representative bid curves that may then be selected for the particular deal. The "Most Customers" bid curve is a first strategy designed to maximize a number of mobile device end users for the product or service that is the subject of the deal being configured. The "Max Value" bid curve is a second strategy designed to maximize the price the vendor can obtain for the product or service, and the "Standard" bid curve is a third strategy designed to trade-off, as a linear function, a number of end users versus a maximum price for the product or service that is the subject of the deal.

Using this interface, the merchant identifies the deal, inputs a regular price, inputs a deal price range (minimum and maximum), identifies a total number of such deals it is willing to provide, identifies a total number of daily deals it is willing to provide, applicable days-of-the-week that the deals will be offered, a redemption period, and the locations at which the deals may be available. As noted above, this information (or at least a portion thereof) comprises the "second data set." Each merchant's second data set typically will differ from another merchant's second data set, although the system may publish templates that can be configured by the participating merchants. Using the interface, the merchant configures and publishes the deal, which is then available to prospective buyers who access the platform.

Although not intending to be limiting, preferably the service provider obtains a percentage of an overall transaction that is consummated (in whole or in part) over the platform.

There is no limit to the types of products and services.

Preferably, the bid process applies, iteratively, a probabilistic bidding algorithm against the second data sets to generate the active bid sets. As noted above, the prices included in the active bid sets typically will vary continuously as the countdown clock moves toward the end user's commit time for the particular product/service he or she desires to obtain. In a preferred embodiment, the probabilistic bidding algorithm is applied against subsets of the second data sets during a series of discrete non-uniform states that follow a continuous time-block Markov chain, and wherein an output of the probabilistic bidding algorithm is a function of a current or recent state (but not a distant past state). A first subset may differ from a second subset across pairs of the discrete states. A probabilistic bidding algorithm implemented in this manner is quite advantageous as is avoids undesired (i.e. destructive) equilibria wherein respective second entities would otherwise simply be driven to minimum prices within their respective price ranges as a result of otherwise unconstrained bidding.

Figure 15:
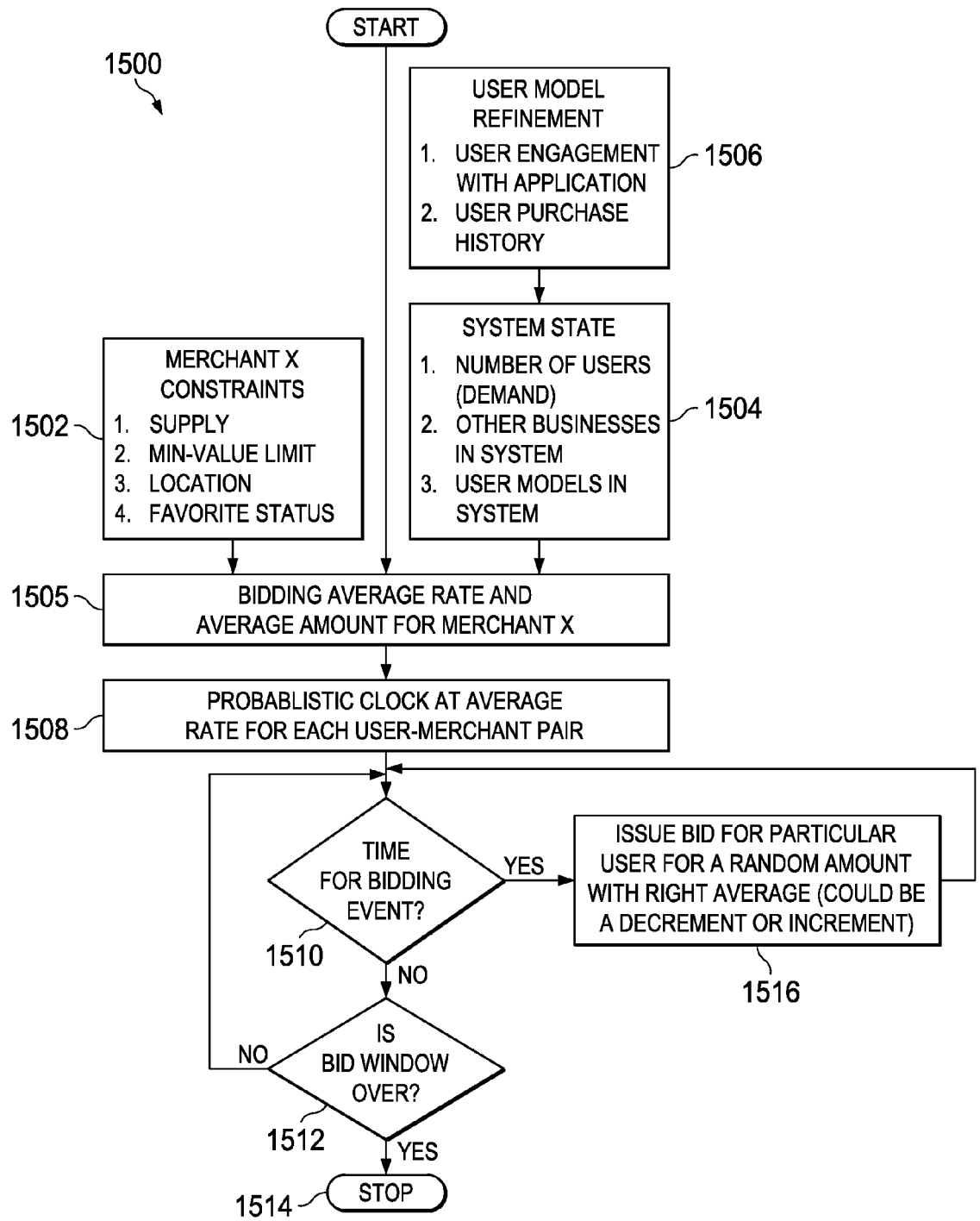
FIG. 15 illustrates a process flow for the bidding on a particular product/service purchase opportunity.

FIG. 15 illustrates a process flow for the probabilistic bidding algorithm for a particular product/service purchase opportunity (i.e., a particular mobile device end user seeking a product/service from a set of vendors, each of whom have configured a deal in the manner previously described). As illustrated, each merchant X has submitted a set of constraints (in the form of a second data set) 1502. Separately, the platform provides system state data 1504, which represents a number of users seeking the product/service at issue, the number of other vendors offering the product/service, and a number of user "models" that the system is currently applying, where a user "model" is selected by the system from a set of models that are developed by the system as users interact with the platform. User model refinement 1506 may take place off-line from a particular bidding process, but the results may be provided as part of the system state, as shown. When the bidding process starts at step 1505, each merchant's average rate and average amount is used. The routine then continues at step 1508, applying a probabilistic clock at an average rate for each user-merchant pair. A test is then performed at step 1510 to determine whether a time for a bidding event has occurred; if not, the routine checks at step 1512 to see whether the user's commit time has been reached. If the commit time is reached, the bidding process is ended at 1514. If the commit time is not reached, however, and if the outcome of the test a step 1510 indicates that a time for a bidding event has been reached, the routine continues at step 1516 to issue a bid for a particular user for a random amount with a right average (decrement or increment). Step 1516 corresponds to the outputting of an active bid (for a particular user), and typically there will be more than one active bid if multiple vendors have the product/service available during the relevant time period as described above. The process continues, iteratively, until such time as the user "buys" the product or service (not shown) or the bid window is over (as indicated by the positive outcome to the test at step 1512).

As further detail, and once again with reference to FIG. 15, the bidding preferably works as follows. Each merchant is represented by its constraints (1502), and each user is represented by their model (1506). Together with the system state (1504), a probabilistic clock is set up for each merchant-user pair (1508). This clock is probabilistic and strikes at a random time according to a pre-defined probabilistic distribution. When a clock strikes (1510), the merchant is question makes a decision on whether or not to bid on the user. The decision to place a bid is coupled with the decision on how much to decrement or increment the price, if at all. The time for the bidding process to continue is checked (1512), and the entire process continues until the user-defined end time for the bidding process is reached.

Thus, preferably the bidding approach preferably is probabilistic, rather than deterministic. The approach is highly advantageous because it builds a sense of suspense (during the bidding), it cannot be scripted and/or gamed easily, and because it is resistant to destructive bidding cycles and malicious agents. By using continuous time Markov chain processing (preferably with an exponential clock and binomial bids), the resulting system is highly-stable, even under heavy bidding load, and it does not drive toward an attractor state.

The above-described technique provides many advantages. The approach provides an active marketplace wherein consumers share their intention to buy, preferably in the 3WHM format (what, when, where and how much) described. That information preferably sets the amount of time that a merchant has to bid on the user's intention to buy. The pricing for a desired product or service is dynamic, as it varies, continuously, during the bidding. At the end of the allotted time, a result is provided and the consumer may purchase the product/service through the platform. The consumer is not necessarily obligated to buy, and preferably the merchant only needs to guarantee the price on the condition that the consumer ends up purchasing the product or service.

As described above, the bidding technique may not require the full 3WHM format for the first data set, which typically includes at least two of the four characteristics (such as at least what, where and how much).

The team theoretic approach of this disclosure is highly beneficial to vendors, which increases the likelihood that they will register for the service. In a team-theoretic approach such as implemented here, a merchant in effect gives way to another in a bidding process by changing his/her probabilities given, for example, that the other merchant has performed an aggressive bid, to thereby avoid a game that could lead to a worse-off equilibrium point for both. This is distinct from collaborative games, wherein agents merely jointly maximize a given objective and do not back off in favor of each other.

In a variant, machine-learning predictive algorithms (e.g. a combination of state vector machines (SVMs) and kernel-based regression) may be used to predict user behavior to further tailor bid amounts and timing. As more and more users sign up and interface with the platform (by undertaking 3WHM-based solicitations in the manner described), the predictive algorithms adapt to the end user information and became smarter.

Each above-described process preferably is implemented in computer software as a set of program instructions executable in one or more processors, as a special-purpose machine.

Representative machines on which the subject matter herein is provided may be Intel Pentium-based computers running a Linux or Linux-variant operating system and one or more applications to carry out the described functionality. One or more of the processes described above are implemented as computer programs, namely, as a set of computer instructions, for performing the functionality described.

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

While the disclosed subject matter has been described in the context of a method or process, the subject matter also relates to apparatus for performing the operations herein. This apparatus may be a particular machine that is specially constructed for the required purposes, or it may comprise a computer otherwise selectively activated or reconfigured by a computer program stored in the computer. Such a computer program may be stored in a computer readable storage medium, such as, but is not limited to, any type of disk including an optical disk, a CD-ROM, and a magnetic-optical disk, a read-only memory (ROM), a random access memory (RAM), a magnetic or optical card, or any type of media suitable for storing electronic instructions, and each coupled to a computer system bus. A given implementation of the present invention is software written in a given programming language that runs in conjunction with a DNS-compliant name server (e.g., BIND) on a standard Intel hardware platform running an operating system such as Linux. The functionality may be built into the name server code, or it may be executed as an adjunct to that code. A machine implementing the techniques herein comprises a hardware processor, and non-transitory computer memory holding computer program instructions that are executed by the processor to perform the above-described methods.

While given components of the system have been described separately, one of ordinary skill will appreciate that some of the functions may be combined or shared in given instructions, program sequences, code portions, and the like.

Preferably, the functionality is implemented in an application layer solution, although this is not a limitation, as portions of the identified functions may be built into an operating system or the like.

The functionality may be implemented with other application layer protocols besides HTTP, such as HTTPS, or any other protocol having similar operating characteristics.

The active bid data and the pricing updates are preferably streamed to the particular end user display using technologies such as AJAX. AJAX technologies include XHTML (Extensible HTML) and CSS (Cascading Style Sheets) for marking up and styling information, the use of DOM (Document Object Model) accessed with client-side scripting languages, the use of an XMLHttpRequest object (an API used by a scripting language) to transfer XML and other text data asynchronously to and from a server using HTTP), and use of XML or JSON (Javascript Object Notation, a lightweight data interchange format) as a format to transfer data between the server and the client.

There is no limitation on the type of computing entity that may implement the client-side or server-side of the connection. Any computing entity (system, machine, device, program, process, utility, or the like) may act as the client or the server.

While given components of the system have been described separately, one of ordinary skill will appreciate that some of the functions may be combined or shared in given instructions, program sequences, code portions, and the like. Any application or functionality described herein may be implemented as native code, by providing hooks into another application, by facilitating use of the mechanism as a plug-in, by linking to the mechanism, and the like.

As used herein, the term "first entity" should be broadly construed to refer to the prospective buyer, such as a mobile device end user that operates the mobile app. The first entity typically is a human being, but it may also be an automated process or computing entity that has been programmed to provide the functionality of specifying the 3WHM data in the manner described (e.g., on behalf of a human user). The term "second entity" should be broadly construed to refer to a provider of a product or service, such as a seller, vendor, business, or other individual or company enterprise. The product or service may be provided by an individual.

The "product" or "service" should be broadly construed and is not limited to a physical good. Products or services may be of any type or nature.

The platform functionality may be co-located or various parts/components may be separately and run as distinct functions, perhaps in one or more locations (over a distributed network).

The mobile application executing on a client device may implement portions of the platform functionality described. For example, the mobile application (the front-end) can perform local bidding updates, even when not connected to the server infrastructure (the back-end). The back-end governs the overall process, as has been described, but the mobile application may be afforded some leeway in making decisions.

While the described embodiment provides a reverse auction (where merchants bid with each other for the right to provide the product/service), the technique herein also may be implemented as a forward auction (where end users bid with each other for the right to obtain the product/service). In such case, the "intention" is expressed by a vendor. Generalizing, the intention-based, dynamic pricing techniques of this disclosure may be used for both reverse and forward auctions.

What is claimed is as follows:

1. Computer apparatus, comprising:
one or more hardware processors;
computer memory storing computer program code executed in the one or more hardware processors to:
establish and maintain a set of probabilistic clock processing threads, each probabilistic clock processing thread associated with a data pair comprising a first data set, and a given second data set;
execute, iteratively, the probabilistic clock processing threads to generate, on a continuous basis but at random times, as determined by strikes of the probabilistic clocks, a set of outputs, wherein each output in the set of outputs is generated within its probabilistic clock processing thread and at its associated probabilistic clock strike and asynchronously with respect to at least one other output such that the set of outputs are generated by the probabilistic clock processing threads in a manner that avoids continuous processing by the computer apparatus even as a number of probabilistic clock processing threads increases, thereby providing an improved operation of the computer apparatus;
provide the set of outputs, together with any update to an output that results from an iteration, to the first entity; and
upon receipt of data indicating a selection from the set of outputs by the first entity, take an action;
wherein:
the first data set is received from a first entity and defines a product or service that the first entity desires to obtain, and a value the first entity is willing to pay to obtain the product or service;
a second data set is received from a second entity and includes a range of data values that that the respective second entity is willing to accept to provide the product or service, and a strategy that defines how a data value within the range of data values is adjusted by a probabilistic clock processing thread associated with the second data set to attempt to obtain for the second entity a right to provide the product or service;
each output in the set of outputs includes a data value within the range of data values that the respective second entity is willing to accept to provide the product or service;
the set of outputs are generated in a manner that avoids undesired data value equilibria wherein respective second entities are driven to minimum data values within their respective data value ranges as a result of iterative execution of the probabilistic clock processing threads; and
the action facilitates an online transaction between the first entity and a given one of the second entities associated with the selection.

2. The apparatus as described in claim 1 wherein the first data set further includes a designated time at or by which the first entity desires to commit to the online transaction, and wherein the probabilistic clock processing threads are executed during a time period between receipt of the first data set and the designated time.

3. The apparatus as described in claim 2 wherein the data value within the range of data values is a price, wherein the price depends on one of: an amount of time remaining before the designated time, a number of other first entities also requesting an intent to buy the product or service, an inventory of the product or service, a distance between the first entity and a respective second entity, and an amount of loyalty points a first entity has accumulated with the respective second entity.

4. The apparatus as described in claim 1 wherein the probabilistic clock processing threads are executed against subsets of the second data sets during a series of discrete states, and wherein the output of a given probabilistic clock processing thread is a function of a current or recent state, and not on a distant past state.

5. The apparatus as described in claim 4 wherein a first subset differs from a second subset across first and second of the discrete states.

6. The apparatus as described in claim 5 wherein the series of discrete steps follow a continuous time block Markov chain.

7. The apparatus as described in claim 5 wherein timing across the series of discrete steps is non-uniform.

8. The apparatus as described in claim 1 wherein the strategy is one of: a first strategy designed to maximize a number of first entities for the product or service, a second strategy designed to maximize a price the respective second entity can obtain for the product or service, and a third strategy designed to trade-off, as a linear function, a number of first entities versus a maximum price for the product or service.

9. The computer apparatus as described in claim 1 wherein the computer program code is executed to provide updates of the outputs to the first entity via an asynchronous data interchange mechanism.

10. A method, comprising:
establishing and maintaining, within a computing entity, a set of probabilistic clock processing sequences, each probabilistic clock processing sequence associated with a data pair comprising a first data set, and a given second data set;
executing, iteratively, the probabilistic clock processing sequences to generate, on a continuous basis but at random times, as determined by strikes of the probabilistic clocks, a set of outputs, wherein each output in the set of outputs is generated within its probabilistic clock processing sequence and at its associated probabilistic clock strike and asynchronously with respect to at least one other output such that the set of outputs are generated by the probabilistic clock processing sequences in a manner that avoids continuous processing by the computer entity even as a number of probabilistic clock processing threads increases, thereby providing an improved operation of the computing entity;
providing the set of outputs, together with any update to an output that results from an iteration, to the first entity; and
upon receipt of data indicating a selection from the set of outputs by the first entity, taking an action;
wherein:
the first data set is received from a first entity and defines a product or service that the first entity desires to obtain, and a value the first entity is willing to pay to obtain the product or service;
a second data set is received from a second entity and includes a range of data values that that the respective second entity is willing to accept to provide the product or service, and a strategy that defines how a data value within the range of data values is adjusted by a probabilistic clock processing sequence associated with the second data set to attempt to obtain for the second entity a right to provide the product or service;

each output in the set of outputs includes a data value within the range of data values that the respective second entity is willing to accept to provide the product or service;

the set of outputs are generated in a manner that avoids undesired data value equilibria wherein respective second entities are driven to minimum data values within their respective data value ranges as a result of iterative execution of the probabilistic clock processing sequences; and the action facilitates an online transaction between the first entity and a given one of the second entities associated with the selection.

11. The method as described in claim 10 wherein the first data set further includes a designated time at or by which the first entity desires to commit to the online transaction, and wherein the probabilistic clock processing sequences are executed during a time period between receipt of the first data set and the designated time.

12. The method as described in claim 11 wherein the data value within the range of data values is a price, wherein the price depends on one of: an amount of time remaining before the designated time, a number of other first entities also requesting an intent to buy the product or service, an inventory of the product or service, a distance between the first entity and a respective second entity, and an amount of loyalty points a first entity has accumulated with the respective second entity.

13. The method as described in claim 10 wherein the probabilistic clock processing sequences are executed against subsets of the second data sets during a series of discrete states, and wherein the output of a given probabilistic clock processing sequence is a function of a current or recent state, and not on a distant past state.

14. The method as described in claim 13 wherein a first subset differs from a second subset across first and second of the discrete states.

15. The method as described in claim 14 wherein the series of discrete steps follow a continuous time block Markov chain.

16. The method as described in claim 14 wherein timing across the series of discrete steps is non-uniform.

17. A computer program product in a non-transitory computer readable medium, the computer program product including program code executed by one or more hardware processors in a computing entity to:

establish and maintain a set of probabilistic clock processing threads, each probabilistic clock processing thread associated with a data pair comprising a first data set, and a given second data set;

execute, iteratively, the probabilistic clock processing threads to generate, on a continuous basis but at random times, as determined by strikes of the probabilistic clocks, a set of outputs, wherein each output in the set of outputs is generated within its probabilistic clock processing thread and at its associated probabilistic clock strike and asynchronously with respect to at least one other output such that the set of outputs are generated by the probabilistic clock processing threads in a manner that avoids continuous processing by the computer apparatus even as a number of probabilistic clock processing threads increases, thereby providing an improved operation of the computing entity;

provide the set of outputs, together with any update to an output that results from an iteration, to the first entity; and upon receipt of data indicating a selection from the set of outputs by the first entity, take an action;

wherein:

the first data set is received from a first entity and defines a product or service that the first entity desires to obtain, and a value the first entity is willing to pay to obtain the product or service;

a second data set is received from a second entity and includes a range of data values that that the respective second entity is willing to accept to provide the product or service, and a strategy that defines how a data value within the range of data values is adjusted by a probabilistic clock processing thread associated with the second data set to attempt to obtain for the second entity a right to provide the product or service;

each output in the set of outputs includes a data value within the range of data values that the respective second entity is willing to accept to provide the product or service;

the set of outputs are generated in a manner that avoids undesired data value equilibria wherein respective second entities are driven to minimum data values within their respective data value ranges as a result of iterative execution of the probabilistic clock processing threads; and the action facilitates an online transaction between the first entity and a given one of the second entities associated with the selection.

18. The computer program product as described in claim 17 wherein the first data set further includes a designated time at or by which the first entity desires to commit to the online transaction, and wherein the probabilistic clock processing threads are executed during a time period between receipt of the first data set and the designated time.

19. The computer program product as described in claim 18 wherein the data value within the range of data values is a price, wherein the price depends on one of: an amount of time remaining before the designated time, a number of other first entities also requesting an intent to buy the product or service, an inventory of the product or service, a distance between the first entity and a respective second entity, and an amount of loyalty points a first entity has accumulated with the respective second entity.

20. The computer program product as described in claim 17 wherein the program code is executed to provide updates of the outputs to the first entity via an asynchronous data interchange mechanism.

* * * * *